United States Patent
Cheng et al.

(10) Patent No.: US 11,232,289 B2
(45) Date of Patent: Jan. 25, 2022

(54) FACE IDENTIFICATION METHOD AND TERMINAL DEVICE USING THE SAME

(71) Applicant: UBTECH ROBOTICS CORP LTD, Shenzhen (CN)

(72) Inventors: Jun Cheng, Shenzhen (CN); Kui Guo, Shenzhen (CN); Jing Gu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 209 days.

(21) Appl. No.: 16/817,554

(22) Filed: Mar. 12, 2020

(65) Prior Publication Data

US 2021/0056295 A1    Feb. 25, 2021

(30) Foreign Application Priority Data

Aug. 23, 2019  (CN) .......................... 201910783151.1

(51) Int. Cl.
  *G06K 9/00*  (2006.01)
  *G06T 5/00*  (2006.01)
  *G06K 9/62*  (2006.01)

(52) U.S. Cl.
  CPC ..... *G06K 9/00295* (2013.01); *G06K 9/00234* (2013.01); *G06K 9/00275* (2013.01); *G06K 9/629* (2013.01); *G06T 5/009* (2013.01); *G06T 2207/20172* (2013.01); *G06T 2207/30201* (2013.01)

(58) Field of Classification Search
  CPC ........... G06K 9/00342; G06K 9/00718; G06K 9/3233; G06K 9/6247; G06K 2209/21; G06K 9/6271; G06K 9/00348; G06N 3/04; G06N 3/0454; G06T 11/20; G06T 2210/12
  See application file for complete search history.

(56) References Cited

U.S. PATENT DOCUMENTS

| | | | |
|---|---|---|---|
| 2007/0086650 A1* | 4/2007 | Li | G06T 5/008 382/162 |
| 2009/0153745 A1* | 6/2009 | Park | H04N 13/257 348/708 |
| 2010/0232705 A1* | 9/2010 | Li | G06K 9/00771 382/195 |
| 2019/0147227 A1* | 5/2019 | Ko | G06T 5/50 382/118 |

* cited by examiner

Primary Examiner — Dhaval V Patel (57) ABSTRACT

The present disclosure provides a face identification method and a terminal device using the same. The method includes: obtaining a to-be-detected image; performing a brightness enhancement process on the to-be-detected image based on a preset second calculation method to generate a to-be-identified face image; obtaining a first channel value of each channel corresponding to each pixel in the to-be-identified face image; performing another brightness enhancement process on the to-be-identified face image based on each first channel value and a preset first calculation method to obtain a target to-be-identified face image; and performing a face identification process on the target to-be-identified face image to obtain an identification result. Through the above-mentioned scheme, an enhanced face identification manner for the images of low brightness is provided.

20 Claims, 4 Drawing Sheets

FACE IDENTIFICATION METHOD AND TERMINAL DEVICE USING THE SAME

CROSS REFERENCE TO RELATED APPLICATIONS

The present disclosure claims priority to Chinese Patent Application No. 201910783151.1, filed Aug. 23, 2019, which is hereby incorporated by reference herein as if set forth in its entirety.

BACKGROUND

1. Technical Field

The present disclosure relates to image identification technology, and particularly to a face identification method and a terminal device using the same.

2. Description of Related Art

Due to insufficient lighting, backlit shooting, and other reasons, there often have problems such as poor quality, too dark in face, and low brightness in the photos taken. When face identification is performed on these photos, it is often difficult to identify them, and the identification results will be inaccurate.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objectives, technical solutions, and advantages of the present disclosure clearer, the present disclosure will be further described in detail below with reference to the drawings and embodiments. It should be understood that, the embodiments described herein are only for explaining the present disclosure and are not intended to limit the present disclosure.

Figure 1:
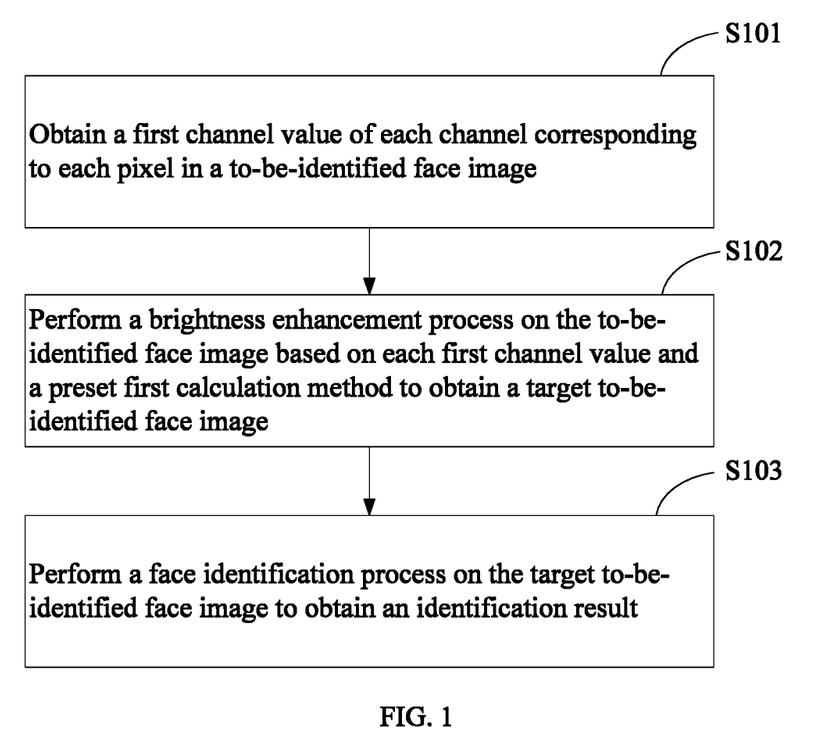
FIG. 1 is a flow chart of an embodiment of a face identification method according to the present disclosure.
Figure 3:
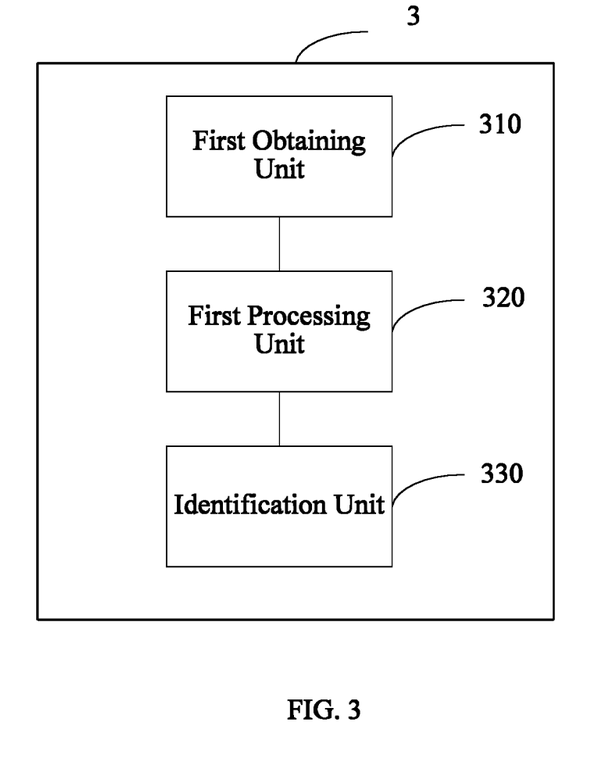
FIG. 3 is a schematic block diagram of an embodiment of a terminal device according to an embodiment of the present disclosure.
Figure 4:
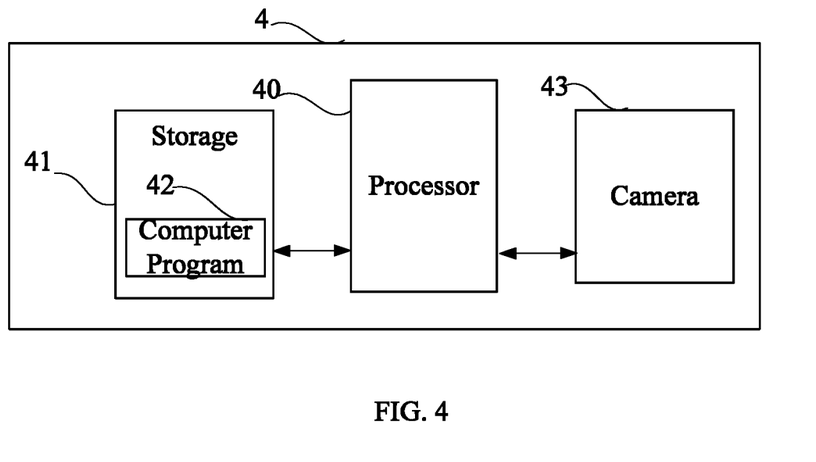
FIG. 4 is a schematic block diagram of another embodiment of a terminal device according to an embodiment of the present disclosure.

FIG. 1 is a flow chart of an embodiment of a face identification method according to the present disclosure. In this embodiment, a face identification method is provided. The body of the execution of the face identification method is a terminal device. The method is a computer-implemented method executable for a processor, which may be implemented through and applied to a terminal device as shown in FIG. 3 or FIG. 4. As shown in FIG. 1, the method includes the following steps.

S101: obtaining a first channel value of each channel corresponding to each pixel in a to-be-identified face image, where each pixel corresponds to a red channel, a green channel, and a blue channel.

In this embodiment, the method is applied to the terminal device such as a portable electronic device (e.g., a smart phone and a tablet computer) or a robot. The to-be-identified face image can be obtained based on an image captured through a camera disposed on the terminal device by photographing the face of a user, which is not limited herein. The to-be-identified face image may be an image including only a human face, or an image including a background and a human face, which is not limited herein.

The terminal device obtains the first channel value of each channel corresponding to each pixel in the to-be-identified face image. The to-be-identified face image is composed of multiple pixels, where each pixel corresponds to three channels of a red (R) channel, a green (G) channel, and a blue (B) channel. Each pixel corresponds to one channel value, that is, the first channel value, at each channel. The corresponding first channel values of the same pixel in different channels may be the same or different, which is subject to actual conditions and is not limited herein. The terminal device obtains the corresponding first channel values of all the pixels in the to-be-identified face image at the red channels, the corresponding first channel values of all the pixels at the green channels, and the corresponding first channel values of all the pixels at the blue channels.

S102: performing a brightness enhancement process on the to-be-identified face image based on each first channel value and a preset first calculation method to obtain a target to-be-identified face image.

The first preset calculation method is set in advance, which is used to perform the brightening process on the to-be-identified face image, so that the brightness of the to-be-identified face image is increased so as to facilitate the terminal device to identify the face of the user in the to-be-identified face image. The terminal device performs the brightness enhancement process on the to-be-identified face image based on the corresponding first channel values of all the pixels at the R channels, the G channels, and the B channels and first preset calculation method, so as to obtain the target to-be-identified face image. In this embodiment, the first preset calculation method can include calculation formula(s), and the terminal device obtains the first channel values of all the pixels in the to-be-identified face image at the R channels, the G channels, and the B channels and performs calculations on these first channel values through the calculation formula(s) included in the first preset calculation method, so as to obtain the corresponding multiple calculation results. The corresponding first channel values of all the pixels at the R channels, the G channels, and the B channels are adjusted to their corresponding calculation results. After the corresponding first channel values of all the pixels in the to-be-identified face image at the R channel, the G channel, and the B channel are adjusted, the to-be-identified face image at this time is stored and marked as the target to-be-identified face image, or the terminal device can also extract and combine all the current pixels to generate the target to-be-identified face image.

Furthermore, in order to obtain a better brightness enhancement effect and thus make the face identification results of the terminal device more accurate, step S102 may include step S1021-S1024 as follows.

In this embodiment, first calculation formulas corresponding to the first preset calculation method include:

$$v = \frac{\sqrt{256 - Y_{mean}}}{4};$$

$$Z_1 = m \times v \times i; \text{ and}$$

$$Z_2 = n \times v \times i;$$

where, $Y_{mean}$ is an average value of a sum channel value of the to-be-identified face image; the sum channel value is the sum of channel values of a Y channel corresponding to all the pixels in the to-be-identified face image; i is the first channel value, m and n are preset values, $Z_1$ is a second channel value, and $Z_2$ is a third channel value.

YCbCr is a type of color space used to describe the colors of an image. When the to-be-identified face image is described using YCbCr, "Y" is the Y channel corresponding to each pixel in the to-be-identified face image. The terminal device obtains the channel value of the Y channels corresponding to all the pixels in the to-be-identified face image, sums the channel values of these Y channels to obtain the total channel value, and the average value of the total channel values is calculated to take as the result of $Y_{mean}$.

i represents the corresponding first channel value of each pixel in the to-be-identified face image at the R channel, G channel, and B channel; m and n are preset values, and the value of m and n can be set according to the actual conditions, which is not limited herein. $Z_1$ and $Z_2$ represent the second channel value and the third channel value, respectively; and the second channel value and the third channel value are used for adjusting the first channel value of each channel corresponding to each pixel in the to-be-identified face image.

S1021: calculating the second channel value and the third channel value corresponding to each channel of each pixel based on each first channel value and the first calculation formula.

As mentioned above, the first calculation formula are:

$$v = \frac{\sqrt{256 - Y_{mean}}}{4};$$

$$Z_1 = m \times v \times i; \text{ and}$$

$$Z_2 = n \times v \times i.$$

In which, $Y_{mean}$ is calculated through the terminal device based on the channel value of the Y channel corresponding to each pixel in the to-be-identified face image, and $Y_{mean}$ is substituted into the formula $$v = \frac{\sqrt{256 - Y_{mean}}}{4}$$

to obtain the value of v, m and n are set in advance, and at this time, for the formulas $Z_1=m \times v \times i$ and $Z_2=n \times v \times i$, m, n and v are all known values. The corresponding first channel value, that is, i, of each pixel in the to-be-identified face image at the R channel, the G channel, and the B channel, respectively, are substituted into the formulas $Z_1=m \times v \times i$ and $Z_2=n \times v \times i$, so as to calculate the second channel value and the third channel value that correspond to the first channel value of each pixel at the R channel, the G channel, and the B channel, respectively.

S1022: obtaining a first image by adjusting the first channel value corresponding to each channel of each pixel in the to-be-identified face image to the corresponding second channel value.

The terminal device adjusts the first channel value corresponding to each pixel based on the second channel value corresponding to each channel of the pixel. The terminal device adjusts the corresponding first channel values of all the pixels in the to-be-identified face image to their corresponding second channel values. In which, each set of the adjusted first channel value and second channel value corresponds to the same pixel, and the channel to which the first channel value belongs is the same as the channel to which the second channel value belongs. It can be understood that, when $Z_1$ is calculated through the formula $Z_1=m \times v \times i$, the first channel value i corresponds to the second channel value $Z_1$, and the terminal device adjusts i to $Z_1$. After the corresponding first channel values of all the channels of all the pixels in the to-be-identified face image are adjusted to their corresponding second channel values, the to-be-identified face image at this time is stored and marked as the first image; or the terminal device can also extract all the current pixels and combine the extracted pixels to generate the first image.

For example, in the to-be-identified face image, the corresponding first channel value of the pixel A at the R channel is 60, and the corresponding second channel value of the pixel A at the R channel is 80, then the corresponding first channel value 60 of the pixel A at the R channel is adjusted to 80; in the to-be-identified face image, the corresponding first channel value of the pixel A at the G channel is 85, and the corresponding second channel value of the pixel A at the G channel is 92, then the corresponding first channel value of the pixel A at the R channel is adjusted from 85 to 92; and in the to-be-identified face image, the corresponding first channel value of the pixel A at the B channel is 40, the corresponding second channel value of the pixel A at the B channel is 60, then the corresponding first channel value of the pixel A at the B channel is adjusted from 40 to 60. The above are merely exemplary descriptions, and are not limited herein.

S1023: obtaining a second image by adjusting the first channel value corresponding to each channel of each pixel in the to-be-identified face image to the corresponding third channel value.

The terminal device adjusts the corresponding first channel value of each pixel according to the third channel value of the pixel at the R channel, the G channel, and the B channel, respectively. The terminal device adjusts the corresponding first channel values of all the pixels in the to-be-identified face image at the R channel, the G channel, and the B channel to their corresponding third channel values. In which, each set of the adjusted first channel value and third channel value correspond to the same pixel, and the channel to which the first channel value belongs is the same as the channel to which the third channel value belongs.

It can be understood that, when $Z_2$ is calculated through the formula $Z_2=n \times v \times i$, the first channel value 1 corresponds to the third channel value $Z_2$, and the terminal device adjusts i to $Z_2$. After the corresponding first channel values of all the channels of all the pixels in the to-be-identified face image are adjusted to their corresponding third channel values, the to-be-identified face image at this time is stored and marked as the second image, or the terminal device can also extract all the current pixels and combine the extracted pixels to generate the second image.

S1024: performing a fusion process on the to-be-identified face image, the first image, and the second image based on a preset weight coefficient to obtain the target to-be-identified face image.

The preset weight coefficient includes a first preset weight coefficient, a preset second weight coefficient, and a third preset weight coefficient. These preset weight coefficients are set in advance. In which, the first preset weight coefficient corresponds to the to-be-identified face image, the preset second weight coefficient corresponds to the first image, and the third preset weight coefficient corresponds to the second image. Based on the first preset weight coefficient corresponding to the to-be-identified face image, the preset second weight coefficient corresponding to the first image, and the third weight coefficient corresponding to the second image, it performs weighted summation on the first channel value, the second channel value, and the third channel value, respectively, of each channel of each pixel, so as to obtain the weighted channel values corresponding to each channel of each pixel. The terminal device adjusts the corresponding first channel value of each pixel based on the weighted channel values corresponding to all the channels of the pixel. The terminal device adjusts the corresponding first channel values of each pixel in the to-be-identified face image at each channel to their corresponding weighted channel values. In which, each set of the adjusted first channel value and weighted channel value corresponds to the same pixel, and the channel to which the first channel value belongs is the same as the channel to which the weighted channel value belongs.

After the corresponding first channel values of all the channels of all the pixels in the to-be-identified face image are adjusted to theirs corresponding weighted channel value, the to-be-identified face image at this time is stored and marked as the target to-be-identified face image, or the terminal device can also extract all the current pixels and combine the extracted pixels to generate the target to-be-identified face image.

Furthermore, in order to obtain a better brightness enhancement effect so as to make the face identification result of the terminal device more accurate, step S1024 may include steps S10241-S10242 as follows.

S10241: performing a weighted summation on the first channel value, the second channel value, and the third channel value corresponding to each channel of each pixel based on the preset weight coefficient corresponding to each of the to-be-identified face image, the first image, and the second image to obtain a weighted channel value corresponding to the channel of each pixel.

The terminal device performs the weighted summation on the first channel value, the second channel value, and the third channel value corresponding to each channel of each pixel based on the preset weight coefficients corresponding to the to-be-identified face image, the first image, and the second image, respectively, to obtain the weighted channel value corresponding to the channel of each pixel. In this embodiment, the preset weight coefficient includes a first preset weight coefficient, a preset second weight coefficient, and a third preset weight coefficient. In which, the first preset weight coefficient corresponds to the to-be-identified face image, the preset second weight coefficient corresponds to the first image, and the third preset weight coefficient corresponds to the second image. The terminal device weights the first channel values of the channel corresponding to each pixel in the to-be-identified face image based on the first preset weight coefficient to obtain the corresponding first weighted channel values, weights the second channel values of each channel corresponding to each pixel in the first image based on the preset second weight coefficient to obtain the corresponding second weighted channel values, and weights the third channel values of the channel corresponding to each pixel in the second image based on the third preset weight coefficient to obtain the corresponding third weighted channel values; the terminal device further calculates the sum of the first weighted channel value, the second weighted channel value, and the third weighted channel value corresponding to each pixel in the to-be-identified face image at the same channel so as to obtain the weighted channel value corresponding to the channel of each pixel.

For example, assuming that the first preset weight coefficient, the preset second weight coefficient, and the third preset weight coefficient are respectively a, b, and c, the first channel value of the red channel corresponding to the pixel A in the to-be-identified face image is d, the second channel value corresponding to the pixel A is e, and the third channel value corresponding to the pixel A is f, the first weighted channel value corresponding to the pixel A in the to-be-identified face image=the first preset weight coefficient*the first channel value, that is, the corresponding first weighted channel value of the pixel A in the to-be-identified face image=a*d; the corresponding second weighted channel value of the pixel A in the first image=the preset second weight coefficient*the second channel value, that is, the corresponding second weighted channel value of the pixel A in the first image=b*e; the corresponding third weighted channel value of the pixel A in the second image=the third preset weight coefficient*the third channel value, that is, the corresponding third weighted channel value of the pixel A in the second image=c*f. The weighted channel value of the red channel corresponding to the pixel A=the first weighted channel value+the second weighted channel value+the third weighted channel value, that is, the weighted channel value of the red channel corresponding to the pixel A=a*d+b*e+c*f.

In an example, the first preset weight coefficient, the preset second weight coefficient, and the third preset weight coefficient are 0.3, 0.5, and 0.2, respectively, the first channel value of the red channel corresponding to the pixel A in the to-be-identified face image is 60, the second channel value corresponding to the pixel A is 80, and the third channel value corresponding to the pixel A is 90. The corresponding first weighted channel value of the pixel A in to-be-identified face image=the first preset weight coefficient*the first channel value; the corresponding second weighted channel value of the pixel A in the first image=the preset second weight coefficient*the second channel value, the corresponding third weighted channel value of the pixel A in the second image=the third preset weight coefficient*the third channel value. The weighted channel value of the red channel corresponding to the pixel A=the first weighted channel value+the second weighted channel value+the third weighted channel value, that is, 0.3*60+0.5*80+0.2*90=76, and the weighted channel value of the red channel corresponding to the pixel A is 76.

S10242: adjusting the first channel value corresponding to each channel of each pixel in the to-be-identified face image to the corresponding weighted channel value to obtain the target to-be-identified face image.

The terminal device adjusts the first channel value corresponding to each pixel based on the weighted channel value of each pixel at the R channel, the G channel, and the B channel, respectively. The terminal device adjusts the first channel value corresponding to each pixel in the to-beidentified face image in each channel to its corresponding weighted channel value. In which, each set of the adjusted first channel value and weighted channel value corresponds to the same pixel, and the channel to which the first channel value belongs is the same as the channel to which the weighted channel value belongs. After the corresponding first channel values of all the channels of all the pixels in the to-be-identified face image are adjusted to theirs corresponding weighted channel value, the to-be-identified face image at this time is stored and marked as the target to-be-identified face image, or the terminal device can also extract all the current pixels and combine the extracted pixels to generate the target to-be-identified face image.

For example, assuming that the first channel value of the R channel corresponding to the pixel A in the to-be-identified face image is 60, the second channel value corresponding to the pixel A is 80, and the third channel value corresponding to the pixel A is 90, then the weighted channel value of the R channel corresponding to the pixel A can be calculated as 76, and then the first channel value 60 of the R channel corresponding to the pixel A in the to-be-identified face image is adjusted to the weighted channel value of 76. In this manner, the corresponding first channel value of each pixel in the to-be-identified face image at the R channel, the G channel, and the B channel, respectively, can be adjusted. The above are merely exemplary descriptions, and are not limited herein.

S103: performing a face identification process on the target to-be-identified face image to obtain an identification result.

The terminal device performs the face identification processing on the target to-be-identified face image to obtain the identification result, for example, identity information of the user that corresponds to the face of the user. In this embodiment, the terminal device extracts the facial features in the target to-be-identified face image, generates feature information corresponding to the target to-be-identified face image based on the facial features, and searches user identification information corresponding to the feature information, that is, the identification result of the target to-be-identified face image, from a database.

In this embodiment, through the scheme of obtaining a first channel value of each channel corresponding to each pixel in a to-be-identified face image; performing a brightness enhancement process on the to-be-identified face image based on each first channel value and a preset first calculation method to obtain a target to-be-identified face image; and performing a face identification process on the target to-be-identified face image to obtain an identification result, the terminal device performs the brightness enhancement process on the to-be-identified face image through a preset calculation method first, and then performs face identification on the target to-be-identified face image after the brightness enhancement process, so that the identification result can be more accurate. In the above-mentioned manner, the brightness enhancement process is performed on the images with poor quality, too dark in face, and low brightness, and the terminal device performs face identification on the images after the brightness enhancement process, which improves the accuracy of identification.

Figure 2:
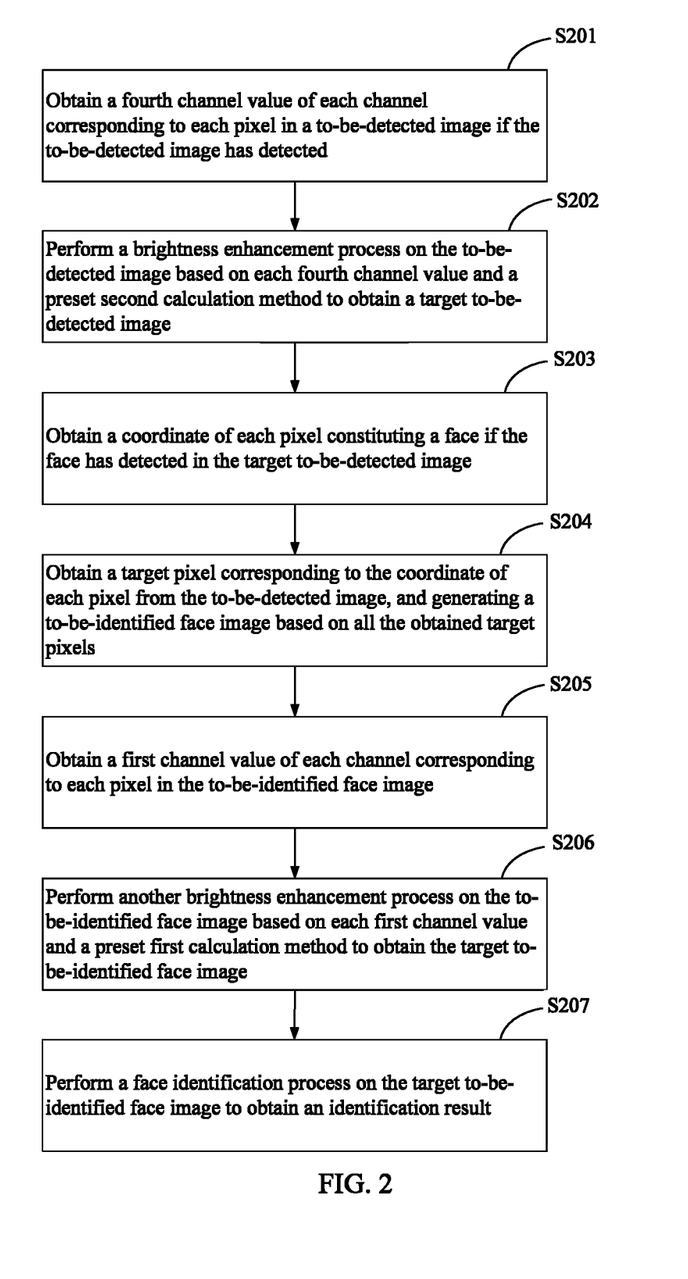
FIG. 2 is a flow chart of another embodiment of a face identification method according to the present disclosure.

FIG. 2 is a flow chart of another embodiment of a face identification method according to the present disclosure. As shown in FIG. 2, another face identification method is provided. In this embodiment, the body of the execution of the face identification method is a terminal device.

The difference between this embodiment and the embodiment of FIG. 1 is in its steps S201-S204, while its steps S205-S207 exactly the same as step S101-S103 in the embodiment of FIG. 1. For details, refer to the related descriptions of steps S101-S103 in the embodiment of FIG. 1, which are not described herein. Furthermore, in this embodiment, in order to facilitate the terminal device to detect the face in the image, before S205, it may further include steps S201-S204 as follows.

S201: obtaining a fourth channel value of each channel corresponding to each pixel in a to-be-detected image if the to-be-detected image has detected.

In this embodiment, the to-be-detected image can be obtained through a camera disposed on the terminal device by photographing a the face of a user; the terminal device can send a to-be-detected image obtaining request to a server, such that the server returns the to-be-detected image to the terminal device based on the to-be-detected image obtaining request; or the user can upload the to-be-detected image to the terminal device, which is not limited herein.

When the terminal device has detected the to-be-detected image, it obtains the fourth channel value of each channel corresponding to each pixel in the to-be-detected image. The to-be-detected image is composed of multiple pixels, where each pixel corresponds to three channels of a red channel, a green channel, and a blue channel. Each pixel corresponds to one channel value, that is, the fourth channel value, in each channel. The corresponding fourth channel values of the same pixel in different channels may be the same or different, which is subject to actual conditions and is not limited herein. When the terminal device has detected the to-be-detected image, it obtains the corresponding fourth channel values of all the pixels in the to-be-detected image at the red channel, the corresponding fourth channel values of all the pixels at the green channel, and the corresponding fourth channel values of all the pixels at the blue channel.

S202: performing the brightness enhancement process on the to-be-detected image based on each fourth channel value and the preset second calculation method to obtain a target to-be-detected image.

The preset second calculation method is set in advance, which is used to perform the brightening process on the to-be-detected image, so that the brightness of the to-be-detected image is increased so as to facilitate the terminal device to detect the face of the user in the to-be-detected image. The terminal device performs the brightness enhancement process on the to-be-detected image according to the fourth channel values and the preset second calculation method so as to obtain the target to-be-detected image. In this embodiment, the preset second calculation method can include calculation formula(s), and the terminal device obtains the fourth pixel values that all the pixels in the to-be-detected image correspond to, and performs calculation on these fourth pixel values through the calculation formula(s) included in the preset second calculation method, so as to obtain corresponding multiple calculation results. The corresponding fourth channel values of all the pixels in the to-be-detected image are adjusted to their corresponding calculation results. After the corresponding fourth channel values of all the pixels in the to-be-detected image are adjusted, the to-be-detected image at this time is stored and marked as the target to-be-detected image, or after the corresponding fourth channel values of all the pixels in the to-be-detected image at the R channel, the G channel, and the B channel, respectively, are adjusted, the terminal device can also extract and combine all the current pixels to generate the target to-be-detected image.

Furthermore, in order to obtain a better brightness enhancement effect and thus make the face identification results of the terminal device more accurate, step S202 may include step S2021-S2022 as follows.

In this embodiment, second calculation formulas corresponding to the preset second calculation method include:

$$S = l \times \left(1 - \frac{G}{255}\right); \text{ and}$$

$$l' = 255 - (255 - l) \times \frac{(255 - S)}{255};$$

where, l is the corresponding fourth channel value of each pixel in the to-be-identified face image at the R channel, the G channel, and the B channel, respectively, G is a fifth channel value of the pixel corresponding to the fourth channel value at the green channel, and l' is a sixth channel value for adjusting the fourth channel value of each channel corresponding each pixel in the to-be-detected image.

S2021: calculating a sixth channel value corresponding to each channel of each pixel based on each fourth channel value, each fifth channel value, and the second calculation formula.

The second calculation formula is:

$$S = l \times \left(1 - \frac{G}{255}\right); \text{ and}$$

$$l' = 255 - (255 - l) \times \frac{(255 - S)}{255};$$

where, the terminal device obtains the fourth channel value, that is, the value of l, of each channel corresponding to each pixel in the to-be-detected image, and simultaneously obtains the fifth channel value, that is, the value of G, of the pixel corresponding to each value l at the green channel. The value S can be calculated through the formula $$S = l \times \left(1 - \frac{G}{255}\right),$$

and the value l' can be calculated based on l, S, and $$l' = 255 - (255 - l) \times \frac{(255 - S)}{255},$$

that is, the corresponding sixth channel value of each channel of each pixel.

S2022: adjusting the fourth channel value corresponding to each channel of each pixel in the to-be-detected image to the corresponding sixth channel value to obtain the target to-be-detected image.

The terminal device adjusts the fourth channel value corresponding to each pixel based on the corresponding sixth channel value of the pixel at the R channel, the G channel, and the B channel, respectively. The terminal device adjusts the corresponding first fourth values of all the pixels in the to-be-identified face image at the R channel, the G channel, and the B channel to their corresponding sixth channel values. In which, each set of the adjusted fourth channel value and sixth channel value corresponds to the same pixel, and the channel to which the fourth channel value belongs is the same as the channel to which the sixth channel value belongs. It can be understood that, when calculating l' through the formulas of $$S = l \times \left(1 - \frac{G}{255}\right) \text{ and}$$

$$l' = 255 - (255 - l) \times \frac{(255 - S)}{255},$$

the fourth channel value l corresponds to the second channel value l', and the terminal device adjusts l to l'. After the fourth channel values corresponding to all the channels of all the pixels in the to-be-detected image is adjusted to their corresponding sixth channel value, the to-be-detected image at this time is stored and marked as the target to-be-detected image; or the terminal device can also extract all the current pixels and combine the extracted pixels to generate the target to-be-detected image.

S203: obtaining a coordinate of each pixel constituting a face if the face has detected in the target to-be-detected image.

The terminal device detects whether there is a face in the target to-be-detected image. If the terminal device has not detected the face in the target to-be-detected image, the process is ended and it may return to step S201; otherwise, if the terminal device has detected the face in the target to-be-detected image, the coordinate of each pixel constituting the face is obtained, and step S204 is executed.

In this embodiment, the terminal device obtains image features in the target to-be-detected image, detects whether the image features include a face area, and if the image features include the face area, a facial features area is marked in the face area, the face is determined based on the face area and the facial features area, and the coordinates of all the pixels constituting the face are obtained.

S204: obtaining a target pixel corresponding to the coordinate of each pixel from the to-be-detected image, and generating the to-be-identified face image based on all the obtained target pixels.

The terminal device obtains the target pixels corresponding to the coordinates of the pixels constituting the face image from the to-be-detected image according to the coordinates of the pixels, and combines these target pixels according to the coordinates of the pixels of the pixels to generate the to-be-identified face image.

In this embodiment, a brightness enhancement process is performed on the to-be-detected image to facilitate the terminal device to detect the face of the user, and then another brightness enhancement process is performed on the to-be-identified face image to facilitate the terminal device to identify the face of the user, which improves the accuracy of identification.

FIG. 3 is a schematic block diagram of an embodiment of a terminal device according to an embodiment of the present disclosure. As shown in FIG. 3, a face identification terminal device is provided. In this embodiment, the terminal device can be a portable electronic device (e.g., a smart phone and a tablet computer) or a robot. Each unit included in the terminal device is configured to each step in the embodiments corresponding to FIG. 1 and FIG. 2. For details, refer to related descriptions in the embodiments corresponding to FIG. 1 and FIG. 2, respectively. For convenience of explanation, only the parts related to this embodiment are shown. Referring to FIG. 3, the terminal device 3 includes:

a first obtaining unit 310 configured to obtain a first channel value of each channel corresponding to each pixel in a to-be-identified face image, if the to-be-identified face image has detected, where each pixel corresponds to a red channel, a green channel, and a blue channel;

a first processing unit 320 configured to perform a brightness enhancement process on the to-be-identified face image based on each first channel value and a preset first calculation method to obtain a target to-be-identified face image; and an identification unit 330 configured to perform a face identification process on the target to-be-identified face image to obtain an identification result.

Furthermore, the first calculation formula corresponding to the first preset calculation method is specifically:

$$v = \frac{\sqrt{256 - Y_{mean}}}{4};$$
$$Z_1 = m \times v \times i; \text{ and}$$
$$Z_2 = n \times v \times i;$$

where, $Y_{mean}$ is an average value of a sum channel value of the to-be-identified face image; the sum channel value is the sum of channel values of a Y channel corresponding to each pixel in the to-be-identified face image; i is the first channel value, m and n are preset values, $Z_1$ is a second channel value, and $Z_2$ is a third channel value.

The first processing unit 320 includes:

a calculation unit configured to calculate the second channel value and the third channel value corresponding to each channel of each pixel based on each first channel value and the first calculation formula;

a first adjustment unit configured to obtain a first image by adjusting the first channel value corresponding to each channel of each pixel in the to-be-identified face image to the corresponding second channel value;

a second adjustment unit configured to obtain a second image by adjusting the first channel value corresponding to each channel of each pixel in the to-be-identified face image to the corresponding third channel value; and a fusion processing unit configured to perform a fusion process on the to-be-identified face image, the first image, and the second image based on a preset weight coefficient to obtain the target to-be-identified face image.

Furthermore, the fusion processing unit is configured to:

performing a weighted summation on the first channel value, the second channel value, and the third channel value corresponding to each channel of each pixel based on the preset weight coefficient corresponding to each of the to-be-identified face image, the first image, and the second image to obtain a weighted channel value corresponding to the channel of each pixel; and adjusting the first channel value corresponding to each channel of each pixel in the to-be-identified face image to the corresponding weighted channel value to obtain the target to-be-identified face image.

Furthermore, the terminal device further includes:

a second obtaining unit configured to obtain a fourth channel value of each channel corresponding to each pixel in a to-be-detected image if the to-be-detected image has detected;

a second processing unit configured to perform the brightness enhancement process on the to-be-detected image based on each fourth channel value and the preset second calculation method to obtain a target to-be-detected image;

a third obtaining unit configured to obtain a coordinate of each pixel constituting a face if the face has detected in the target to-be-detected image; and a generation unit configured to obtain a target pixel corresponding to the coordinate of each pixel from the to-be-detected image, and generating the to-be-identified face image based on all the obtained target pixels.

Furthermore, a second calculation formula corresponding to the preset second calculation method is:

$$S = l \times \left(1 - \frac{G}{255}\right); \text{ and}$$
$$l' = 255 - (255 - l) \times \frac{(255 - S)}{255};$$

where, l is the fourth channel value, G is a fifth channel value of the pixel corresponding to the fourth channel value at the green channel, and l' is a sixth channel value;

the second processing unit is configured to:

calculate a sixth channel value corresponding to each channel of each pixel based on each fourth channel value, each fifth channel value, and the second calculation formula; and adjust the fourth channel value corresponding to each channel of each pixel in the to-be-detected image to the corresponding sixth channel value to obtain the target to-be-detected image.

In this embodiment, each of the above-mentioned modules/units is implemented in the form of software, which can be computer program(s) stored in a memory of the terminal device 3 and executable on a processor of the terminal device 3. In other embodiments, each of the above-mentioned modules/units may be implemented in the form of hardware (e.g., a circuit of the terminal device 3 which is coupled to the processor of the terminal device 3) or a combination of hardware and software (e.g., a circuit with a single chip microcomputer).

FIG. 4 is a schematic block diagram of another embodiment of a terminal device according to an embodiment of the present disclosure. As shown in FIG. 4, in this embodiment, the terminal device 4 includes a processor 40, a storage 41, a computer program 42 stored in the storage 41 and executable on the processor 40, and a camera 43. When executing (instructions in) the computer program 42, the processor 40 implements the steps in the above-mentioned embodiments of the face identification method, for example, steps S101-S103 shown in FIG. 1. Alternatively, when the processor 40 executes the (instructions in) computer program 42, the functions of each unit in the above-mentioned device embodiments, for example, the functions of the units 310-330 shown in FIG. 3 are implemented.

Exemplarily, the computer program 42 may be divided into one or more units, and the one or more units are stored in the storage 41 and executed by the processor 40 to realize the present disclosure. The one or more units may be a series of computer program instruction sections capable of performing a specific function, and the instruction sections are for describing the execution process of the computer program 42 in the terminal device 4. For example, the computer program 42 can be divided into a first obtaining unit, a first processing unit, and an identification unit. The function of each module is as the above.

The terminal device 4 may include, but is not limited to, the processor 40 and the storage 41. It can be understood by those skilled in the art that FIG. 4 is merely an example of the terminal device 4 and does not constitute a limitation on the terminal device 4, and may include more or fewer components than those shown in the figure, or a combination of some components or different components.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the terminal device 4, for example, a memory of the terminal device 4. The storage 41 may also be an external storage device of the terminal device 4, for example, a plug-in hard disk, a smart media card (SMC), a secure digital (SD) card, flash card, and the like, which is equipped on the terminal device 4. Furthermore, the storage 41 may further include both an internal storage unit and an external storage terminal, of the terminal device 4. The storage 41 is configured to store the computer program 42 and other programs and data required by the terminal device 4. The storage 41 may also be used to temporarily store data that has been or will be output.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented face identification method, comprising executing on a processor steps of:
    obtaining a to-be-detected image;
    performing a brightness enhancement process on the to-be-detected image based on a preset second calculation method to generate a to-be-identified face image;
    obtaining a first channel value of each channel corresponding to each pixel in the to-be-identified face image, wherein each pixel corresponds to a red channel, a green channel, and a blue channel;
    performing another brightness enhancement process on the to-be-identified face image based on each first channel value and a preset first calculation method to obtain a target to-be-identified face image; and
    performing a face identification process on the target to-be-identified face image to obtain an identification result.

2. The method of claim 1, wherein first calculation formula corresponding to the first preset calculation method comprise:

$$v = \frac{\sqrt{256 - Y_{mean}}}{4};$$

$$Z_1 = m \times v \times i; \text{ and}$$

$$Z_2 = n \times v \times i;$$

where, $Y_{mean}$ is an average value of a sum channel value of the to-be-identified face image; the sum channel value is the sum of channel values of a Y channel corresponding to all the pixels in the to-be-identified face image; i is the first channel value, m and n are preset values, $Z_1$ is a second channel value, and $Z_2$ is a third channel value;

wherein, the step of performing the another brightness enhancement process on the to-be-identified face image based on each first channel value and the preset first calculation method to obtain the target to-be-identified face image comprises:
    calculating the second channel value and the third channel value corresponding to each channel of each pixel based on each first channel value and the first calculation formula;
    obtaining a first image by adjusting the first channel value corresponding to each channel of each pixel in the to-be-identified face image to the corresponding second channel value;
    obtaining a second image by adjusting the first channel value corresponding to each channel of each pixel in the to-be-identified face image to the corresponding third channel value; and
    performing a fusion process on the to-be-identified face image, the first image, and the second image based on a preset weight coefficient to obtain the target to-be-identified face image.

3. The method of claim 2, wherein the step of performing the fusion process on the to-be-identified face image, the first image, and the second image based on the preset weight coefficient to obtain the target to-be-identified face image comprises:
    performing a weighted summation on the first channel value, the second channel value, and the third channel value corresponding to each channel of each pixel based on the preset weight coefficient corresponding to each of the to-be-identified face image, the first image, and the second image to obtain a weighted channel value corresponding to the channel of each pixel; and
    adjusting the first channel value corresponding to each channel of each pixel in the to-be-identified face image to the corresponding weighted channel value to obtain the target to-be-identified face image.

4. The method of claim 1, wherein the step of performing the brightness enhancement process on the to-be-detected image based on the preset second calculation method to generate the to-be-identified face image comprises:
    obtaining a fourth channel value of each channel corresponding to each pixel in the to-be-detected image in response to having detected the to-be-detected image;
    performing the brightness enhancement process on the to-be-detected image based on each fourth channel value and the preset second calculation method to obtain a target to-be-detected image;
    obtaining a coordinate of each pixel constituting a face in response to the face having detected in the target to-be-detected image; and
    obtaining a target pixel corresponding to the coordinate of each pixel from the to-be-detected image, and generating the to-be-identified face image based on all the obtained target pixels.

5. The method of claim 4, wherein a second calculation formula corresponding to the preset second calculation method is:

$$S = l \times \left(1 - \frac{G}{255}\right); \text{ and}$$

$$l' = 255 - (255 - l) \times \frac{(255 - S)}{255};$$

where, l is the fourth channel value, G is a fifth channel value of the pixel corresponding to the fourth channel value at the green channel, and l' is a sixth channel value;

wherein, the step of performing the brightness enhancement process on the to-be-detected image based on each fourth channel value and the preset second calculation method to obtain the target to-be-detected image comprises:

calculating a sixth channel value corresponding to each channel of each pixel based on each fourth channel value, each fifth channel value, and the second calculation formula; and adjusting the fourth channel value corresponding to each channel of each pixel in the to-be-detected image to the corresponding sixth channel value to obtain the target to-be-detected image.

6. The method of claim 4, wherein the step of obtaining the coordinate of each pixel constituting the face in response to the face having detected in the target to-be-detected image comprises:

obtaining image features in the target to-be-detected image;

detecting whether the image features include a face area;

marking a facial features area in the face area in response to the image features including a face area;

determining the face based on the face area and the facial features area; and obtaining the coordinates of all the pixels constituting the face.

7. The method of claim 1, wherein the step of performing the face identification process on the target to-be-identified face image to obtain the identification result comprises:

extracting facial features in the target to-be-identified face image;

generating feature information based on the facial features;

searching user identification information corresponding to the feature information from a database to use as the identification result.

8. The method of claim 1, wherein the to-be-detected image is obtained through a camera.

9. A terminal device, comprising:

a second processing unit configured to obtain a to-be-detected image and perform a brightness enhancement process on the to-be-detected image based on a preset second calculation method to generate a to-be-identified face image;

a first obtaining unit configured to obtain a first channel value of each channel corresponding to each pixel in the to-be-identified face image, wherein each pixel corresponds to a red channel, a green channel, and a blue channel;

a first processing unit configured to perform another brightness enhancement process on the to-be-identified face image based on each first channel value and a preset first calculation method to obtain a target to-be-identified face image; and an identification unit configured to perform a face identification process on the target to-be-identified face image to obtain an identification result.

10. The terminal device of claim 9, wherein the second processing unit is configured to perform a brightness enhancement process on the to-be-detected image based on each fourth channel value and the preset second calculation method to obtain a target to-be-detected image, and the terminal device further comprises:

a second obtaining unit configured to obtain a fourth channel value of each channel corresponding to each pixel in a to-be-detected image in response to having detected the to-be-detected image;

a third obtaining unit configured to obtain a coordinate of each pixel constituting a face image in response to the face image having detected in the target to-be-detected image; and a generation unit configured to obtain a target pixel corresponding to the coordinate of each pixel from the to-be-detected image, and generating the to-be-identified face image based on each target pixel.

11. The terminal device of claim 10, wherein second processing unit is configured to:

calculate a sixth channel value corresponding to each channel of each pixel based on each fourth channel value, each fifth channel value, and the second calculation formula; and adjust the fourth channel value corresponding to each channel of each pixel in the to-be-detected image to the corresponding sixth channel value to obtain the target to-be-detected image.

12. The terminal device of claim 9, further comprising a camera, wherein the camera captures the to-be-detected image.

13. A terminal device, comprising:

a memory;

a processor; and one or more computer programs stored in the memory and executable on the processor, wherein the one or more computer programs comprise:

instructions for obtaining a to-be-detected image;

instructions for performing a brightness enhancement process on the to-be-detected image based on a preset second calculation method to generate a to-be-identified face image;

instructions for obtaining a first channel value of each channel corresponding to each pixel in the to-be-identified face image, wherein each pixel corresponds to a red channel, a green channel, and a blue channel;

instructions for performing another brightness enhancement process on the to-be-identified face image based on each first channel value and a preset first calculation method to obtain a target to-be-identified face image; and instructions for performing a face identification process on the target to-be-identified face image to obtain an identification result.

14. The terminal device of claim 13, wherein first calculation formula corresponding to the first preset calculation method comprise:

$$v = \frac{\sqrt{256 - Y_{mean}}}{4};$$

-continued $$Z_1 = m \times v \times i; \text{ and}$$

$$Z_2 = n \times v \times i;$$

where, $Y_{mean}$ is an average value of a sum channel value of the to-be-identified face image; the sum channel value is the sum of channel values of a Y channel corresponding to all the pixels in the to-be-identified face image; i is the first channel value, m and n are preset values, $Z_1$ is a second channel value, and $Z_2$ is a third channel value;

wherein, the instructions for performing the another brightness enhancement process on the to-be-identified face image based on each first channel value and the preset first calculation method to obtain the target to-be-identified face image comprise:

instructions for calculating the second channel value and the third channel value corresponding to each channel of each pixel based on each first channel value and the first calculation formula;

instructions for obtaining a first image by adjusting the first channel value corresponding to each channel of each pixel in the to-be-identified face image to the corresponding second channel value;

instructions for obtaining a second image by adjusting the first channel value corresponding to each channel of each pixel in the to-be-identified face image to the corresponding third channel value; and instructions for performing a fusion process on the to-be-identified face image, the first image, and the second image based on a preset weight coefficient to obtain the target to-be-identified face image.

15. The terminal device of claim 14, wherein the instructions for performing the fusion process on the to-be-identified face image, the first image, and the second image based on the preset weight coefficient to obtain the target to-be-identified face image comprise:

instructions for performing a weighted summation on the first channel value, the second channel value, and the third channel value corresponding to each channel of each pixel based on the preset weight coefficient corresponding to each of the to-be-identified face image, the first image, and the second image to obtain a weighted channel value corresponding to the channel of each pixel; and instructions for adjusting the first channel value corresponding to each channel of each pixel in the to-be-identified face image to the corresponding weighted channel value to obtain the target to-be-identified face image.

16. The terminal device of claim 13, wherein the instructions for performing the brightness enhancement process on the to-be-detected image based on the preset second calculation method to generate the to-be-identified face image comprise:

instructions for obtaining a fourth channel value of each channel corresponding to each pixel in the to-be-detected image in response to having detected the to-be-detected image;

instructions for performing the brightness enhancement process on the to-be-detected image based on each fourth channel value and the preset second calculation method to obtain a target to-be-detected image;

instructions for obtaining a coordinate of each pixel constituting a face in response to the face having detected in the target to-be-detected image; and instructions for obtaining a target pixel corresponding to the coordinate of each pixel from the to-be-detected image, and generating the to-be-identified face image based on all the obtained target pixels.

17. The terminal device of claim 16, wherein a second calculation formula corresponding to the preset second calculation method is:

$$S = l \times \left(1 - \frac{G}{255}\right); \text{ and}$$

$$l' = 255 - (255 - l) \times \frac{(255 - S)}{255};$$

where, l is the fourth channel value, G is a fifth channel value of the pixel corresponding to the fourth channel value at the green channel, and l' is a sixth channel value;

wherein, the instructions for performing the brightness enhancement process on the to-be-detected image based on each fourth channel value and the preset second calculation method to obtain the target to-be-detected image comprise:

instructions for calculating a sixth channel value corresponding to each channel of each pixel based on each fourth channel value, each fifth channel value, and the second calculation formula; and instructions for adjusting the fourth channel value corresponding to each channel of each pixel in the to-be-detected image to the corresponding sixth channel value to obtain the target to-be-detected image.

18. The terminal device of claim 16, wherein the instructions for obtaining the coordinate of each pixel constituting the face in response to the face having detected in the target to-be-detected image comprise:

instructions for obtaining image features in the target to-be-detected image;

instructions for detecting whether the image features include a face area;

instructions for marking a facial features area in the face area in response to the image features including a face area;

instructions for determining the face based on the face area and the facial features area; and instructions for obtaining the coordinates of all the pixels constituting the face.

19. The terminal device of claim 13, wherein the instructions for performing the face identification process on the target to-be-identified face image to obtain the identification result comprise:

instructions for extracting facial features in the target to-be-identified face image;

instructions for generating feature information based on the facial features;

instructions for searching user identification information corresponding to the feature information from a database to use as the identification result.

20. The terminal device of claim 13, further comprising a camera, wherein the to-be-detected image is captured through the camera.

* * * * *